Jan. 27, 1953　　　　M. LAMMERTSE　　　　2,626,422
LATERAL STRETCHING OF THERMOELASTIC FILMS
Filed Feb. 28, 1950　　　　　　　　　　4 Sheets-Sheet 1

Inventor
MEINDERT LAMMERTSE

ATTORNEY

Inventor
MEINDERT LAMMERTSE
By
R. L. Miller
ATTORNEY

Jan. 27, 1953  M. LAMMERTSE  2,626,422
LATERAL STRETCHING OF THERMOELASTIC FILMS
Filed Feb. 28, 1950  4 Sheets-Sheet 3
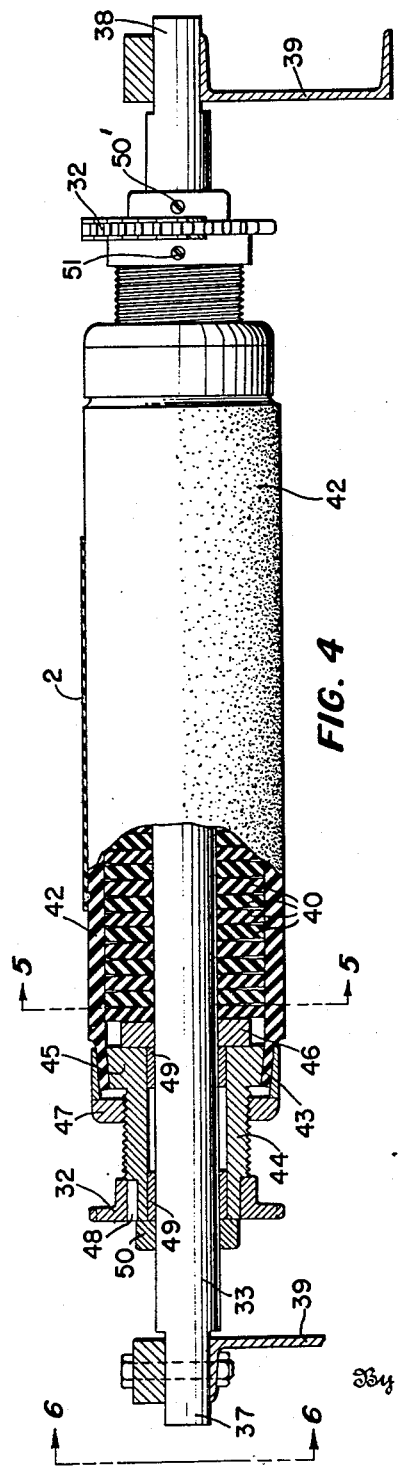
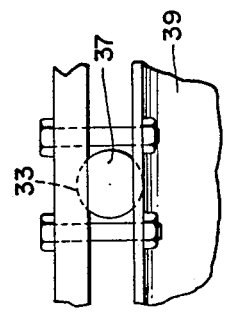
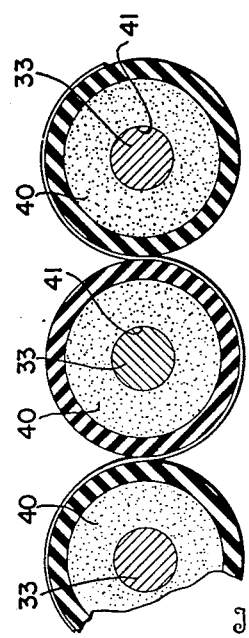
Inventor
MEINDERT LAMMERTSE
ATTORNEY

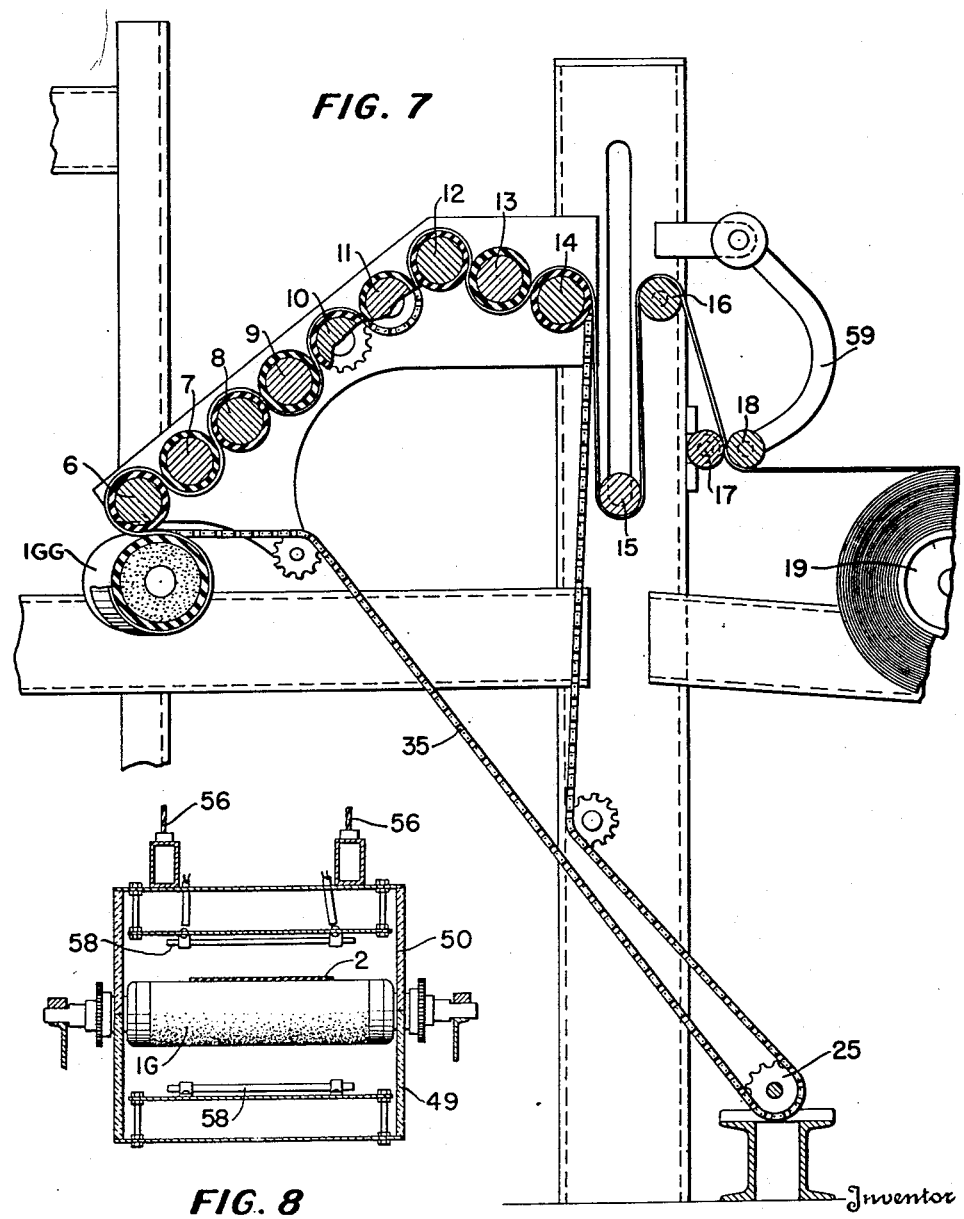

Patented Jan. 27, 1953

2,626,422

UNITED STATES PATENT OFFICE 2,626,422

LATERAL STRETCHING OF THERMO-ELASTIC FILMS

Meindert Lammertse, Cuyahoga Falls, Ohio, assignor to Wingfoot Corporation, Akron, Ohio, a corporation of Delaware Application February 28, 1950, Serial No. 146,689

10 Claims. (Cl. 18—1)

1

This invention relates to the lateral stretching of thermo-elastic films. It includes the process of stretching and equipment used in carrying out the process.

Thermo-elastic films include, for example, rubber hydrochloride film, etc. They are substantially inelastic at room temperatures but, when heated, they are elastic. If stretched when heated and maintained in a stretched condition until they cool or set, they remain stretched but, on subsequent heating, they will contract. Their elasticity is not unlike that of rubber, except that whereas rubber is elastic at room temperatures, thermo-elastic materials are not elastic at room temperature, but become elastic when heated to elevated temperatures. The temperatures at which the heat-sealable thermo-elastic films become elastic are just under the temperatures at which they become heat-sealable. The temperatures at which these materials are thermo-elastic are under the temperatures at which they liquefy.

Thermo-elastic films, immediately after stretching and while they are still at the stretching temperature, tend to contract. It is necessary to maintain them in a stretched condition until this tendency to contract has been minimized. Generally, the tendency of a thermo-elastic film to contract decreases as the film cools. The tendency to contract persists in rubber hydrochloride film for a period after cooling. The necessity for maintaining the film in a stretched condition until it sets, has complicated the stretching of thermo-elastic films.

A further difficulty results from the fact that films, such as cast rubber hydrochloride do not stretch uniformly during the initial stages of stretching, but the thinner areas of film stretch more readily than thicker areas. No film is of exactly uniform thickness. As the thinner portions of a film are stretched, they become still thinner and stretch more easily. This tendency toward non-uniform stretching pertains only during the stretching of film up to a certain percentage of stretch. Beyond this percentage, more pull is required as the percentage of stretch increases. However, starting with cast film it is difficult or impossible to produce uniform stretching by gripping a film at the edges and stretching it laterally unless the tendency of the thinner areas of film to stretch more than the thicker areas is offset by local cooling or the like.

It is not so difficult to stretch film uniformly in a longitudinal direction because when the film is drawn over a roll operated at a lower rate of speed to a roll operated at a higher rate of speed, the stretching occurs in an area which is little more than the width of the line along which the film leaves the roll which is rotated at the lower speed, and this line is constantly changing as the film passes from the one roll to the other. Thus, the area being stretched is continuously changing and the tendency of the film to stretch in the thinner areas more rapidly than in the thicker areas is scarcely discernible.

According to this invention, difficulties in lateral stretching are overcome by maintaining the film in contact with an expanding surface throughout the stretching period. This surface is made up of a series of contacting expansible coverings which are rotated on arcuate axes which lie in the same plane. The individual coverings are constantly rotated and expanded from the short side of the arcuate surface to the long side. First one surface of the film is brought into contact with one such expanding surface and then the other side is brought into contact with an adjoining expanding surface. Thus, throughout the stretching operation, alternate areas along the length of the film and on opposite sides of the film are in contact with expanding surfaces, and the area of the film in contact with anyone expanding surface is continually changing. In this manner the film is stretched progressively as it is brought, first in contact with one expanding surface and then with another expanding surface, each successive expanding surface stretching the film laterally more and more, and by bringing the film into contact with successive expanding surfaces, it is stretched increasingly in the lateral direction. The amount it is stretched depends upon the arc of the axes of the individual rollers and the number of arcuate members employed.

After stretching, the film is transferred from the last arcuate member to a cylindrical roll and passed from there to other cylindrical rolls or handling equipment of usual design where it is set by cooling, etc. Ordinarily, the cooling takes place after the film has been removed from the arcuate rollers in order to utilize these rolls to the greatest advantage.

Each arcuate member is formed on an arcuate axis of circular cross section. There are mounted on this axis adjacent one another a series of circular discs, in each of which at the center is a circular opening which just fits over the arcuate axis. The discs are preferably of substantial thickness at the circumference, and are thicker at the center opening than at the circumference so that on the short side of the arcuate axis the discs touch at the opening. A rubber sleeve encloses the various discs. The axis does not rotate; the sleeve is revolved and the discs turn with it to a greater or less extent. On the short side of the arcuate member these discs touch (or substantially touch), but on the long side they are spread apart. Thus, as the discs are turned about the arcuate axis their circumferential surfaces separate and stretch the rubber sleeve. The portion of the sleeve in contact with the circumferential surfaces of the disc as they return to the short side of the arcuate member, contracts. Thus, as the discs are turned on the several arcuate axes, the sleeve members are separately stretched. The stretched sleeve of one axis is brought into contact with the unstretched sleeve of the adjoining axis, and the film stretches as it is brought into contact with first one and then another.

The invention will be further described in connection with the accompanying drawings, in which—

Fig. 4 is a front elevation of one of the stretching units partly broken away and with the film shown on its upper surface;

Fig. 5 is a section on the line 5—5 of Fig. 4 showing a section through three of the stretching units;

Fig. 6 is an end view of the unit shown in Fig. 4;

Fig. 7 is an elevation of the delivery end of the equipment showing the last of the stretching units; and Fig. 8 is a section on the line 8—8 of Fig. 1, showing the location of the upper and lower heaters.

Figure 1:
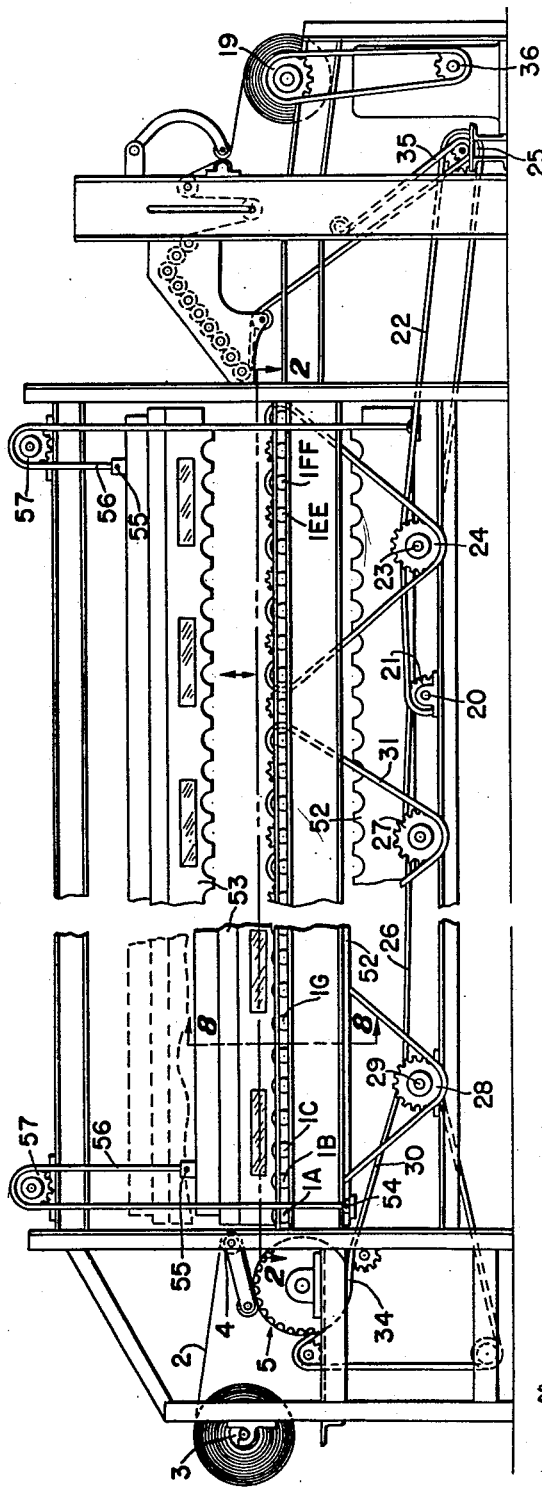
Fig. 1 is a side elevation of the stretching equipment, broken away toward the center, showing at the left side of the drawing the upper and lower portions of the heating chamber brought together, and at the right side showing them separated.
Figure 2:
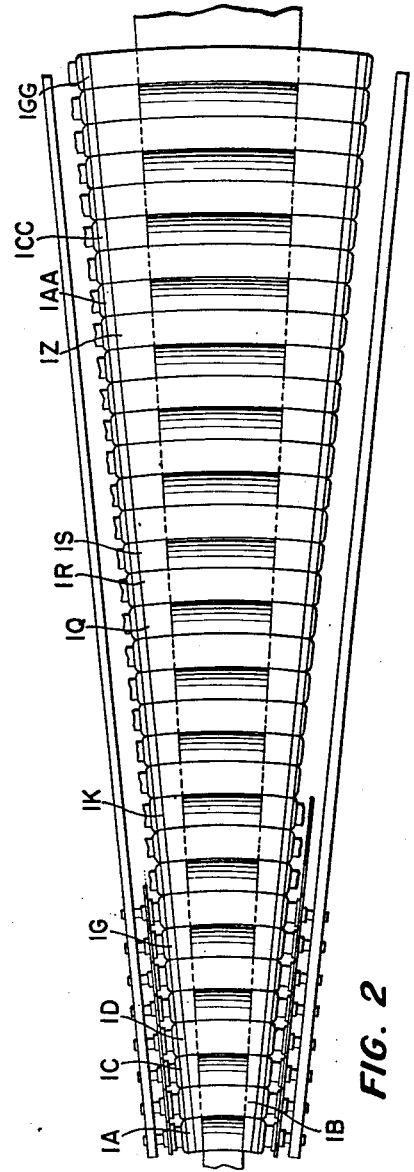
Fig. 2 is a plan view of the entire series of arcuate stretching units.
Figure 3:
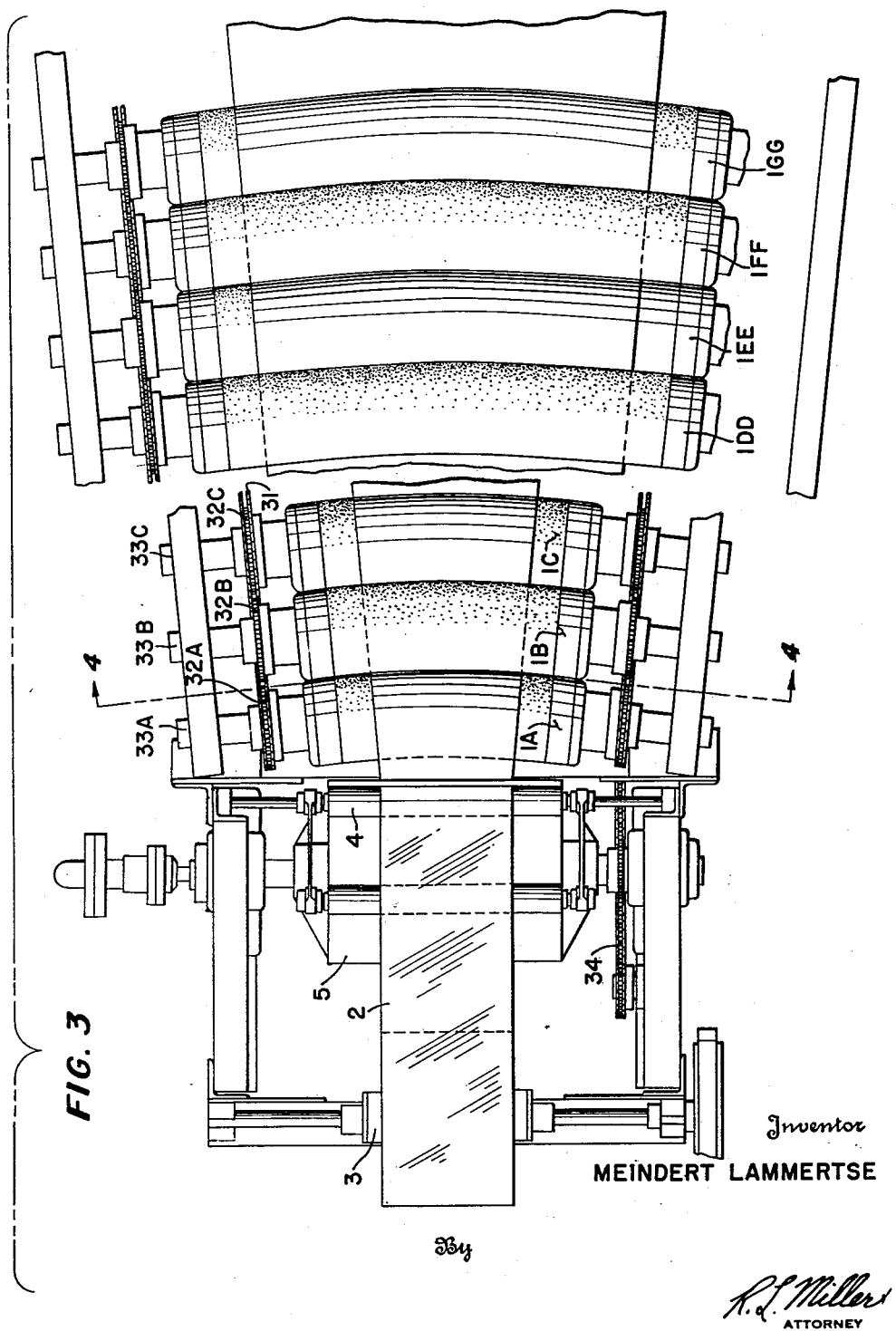
Fig. 3 is an enlarged plan view of the stretching units broken away toward the middle, and includes the feeding mechanism.

The equipment illustrated in the drawings includes thirty-three individual stretching units, identified by the reference numerals 1a, 1b, 1c, through 1z and on through 1aa, 1bb, to 1gg. The thermo-elastic film 2 is supplied from the supply roll 3 over the guide roller 4 and around the heating drum 5, up over the first stretching unit 1a. The film is then threaded down under the unit 1b and up over the unit 1c on through the rest of the units in order, until it comes up over the unit 1gg. Figure 7 shows the film being transferred from this unit over the cylindrical rollers 6, 7, 8, 9, 10, 11, 12, 13 and 14 and then down under the floating roller 15 and up over the roller 16, and thence between the rollers 17 and 18 to the windup roller 19. These rollers 6 through 19 are driven in any suitable manner. The drawing illustrates a main driving shaft 20 on which two gears are mounted, only gear 21 being shown. This drives the chain 22 which, in turn, through a sprocket (not shown) on the shaft 23, turns the sprocket 24 and the sprocket 25. The other gear, mounted on the drive shaft 20, by means of chain 26 turns sprockets 27 and 28. The chain 30 is driven through a gear mounted on the shaft 29. The sprockets 24, 27 and 28 (and identical sprockets located between the latter two) drive chains 31, which, in turn, drive the sprockets 32a, 32b, 32c, etc. on the arcuate shafts 33a, 33b, etc. about which the individual stretching units rotate. The chain 30 drives sprocket 34, which, in turn, drives the heating drum 5. Chain 35 at the delivery end of the machine, drives rollers 6, 7, etc. as shown in Fig. 7. The windup drum 19 is driven from the gear 36 which is separately driven.

The construction of the individual stretching units is best discussed in connection with Figs. 4, 5 and 6. The arcuate shaft 33 is circular in cross section. The ends 37 and 38 are flattened and rigidly held on the channels 39. These axial shafts do not turn, but the individual discs 40 rotate about them. These discs 40 are made of stiff rubber, or the like. Each is provided with a central circular opening 41 which encompasses the shaft 33. Each disc is thicker at its opening 41 than at its circumference. On the short side of the arcuate shaft the surfaces of the discs lie substantially parallel with the radii of the axis of shaft 33. This permits the discs to rotate about the shaft 33 while touching at their openings 41, although this shaft is not straight but is arcuate. The surfaces of the discs are brought together or substantially together on the short side of the arcuate shaft and they separate on the far side of the arcuate shaft.

The discs 40 of each stretching unit are covered by a rubber sleeve 42. This sleeve expands as it is rotated from the short side of the stretching unit to the long side. The film 2 makes its first contact with the sleeve at the short side of the stretching unit and moves in contact with it to the long side, and contact with the sleeve during this portion of its cycle of rotation causes the film to be stretched laterally.

In order to insure uniform rotation of the discs, each end 43 of the rubber sleeve is held to an externally threaded member 44, the inner end of which broadens out to the tapered surface 45. It is separated from the discs by the metal compression member or sleeve 46. The cap 47 is threaded on the member 44 and as it is turned down over the tapered surface 45, the grip on the end 43 of the rubber sleeve is tightened. There is a sprocket 32 at each end of the unit and each is held to turn with the member 44 by a key 48. These sprockets are turned simultaneously and at the same rate of speed and turn the sleeve and discs with them. The bronze bushings 49 are pressed into the member 44 and turn with it. These bushings serve as bearings. Thus the discs and sleeves rotate on the shaft 33.

Collars 50 are held to the shaft 33 by the setscrews 50' and prevent the discs from moving laterally along the shaft. Setscrews 51 prevent lateral movement between the sprockets 32 and members 44.

The stretching units are enclosed in an oven or chamber which is divided horizontally at about the level of the stretching units. The left end of Fig. 1 shows the two halves 52 and 53 in the closed position. The right end of Fig. 1 shows these units in the open position. The lower half 52 and upper half 53 are fastened to the opposite ends 54 and 55 of the chains 56 which pass over the sprockets 57. Suitable means (not shown) is provided to turn all of the sprockets 57 simultaneously and thus open and close the two halves of the oven which enclose the stretching units.

Inside of the heating chamber, above and below the stretching units are heaters which control the temperature inside the chamber. Ordinarily, the temperature will be maintained uniform from one end of the chamber to the other, although regulation of the temperature so as to maintain one part of the chamber hotter than another is possible. Any sort of heating means may be provided. Fig. 8 shows heating elements 58 above and below the stretching units which are advantageously located directly above and below alternate stretching units and on the side of those units which are free of film. Thus, a heating unit may be located below stretching units 1c, 1e, etc. and above stretching units 1b, 1d, etc. This gives efficient heating with minimum danger of overheating the film.

The film must be maintained in a stretched condition beyond the last stretching unit and until after it has set. For this purpose the first of the cylindrical rollers 6 to which the film is transferred is placed adjacent the surface of the last stretching unit 1gg with its axis intermediate between the ends and the middle of the axis 33 of the unit 1gg. Thus, the film, in being transferred to the cylindrical roller is maintained under more nearly uniform tension than if the axis of the roller 6 were adjacent either the ends or the middle of the unit 1gg or in any other position. The film passes over the roller 6 and under the roller 7, etc. and in this way is maintained in contact with the surface of these rollers without further stretching and without contraction, and the film is thus maintained in a stretched condition until it has set. The film may be cooled by being blown with air. Alternatively the rollers may be water-cooled. Any suitable means may be utilized for cooling and setting the film in the stretched condition. The set film is eventually removed to the windup roll 19. The roller 18 is mounted on the arms 59 and rests in contact with the rollers 17 under normal operating conditions, but will swing upwardly against the weight of the arms 56 and roller 18 to relieve any sudden increase in tension on the film at the windup.

It will be appreciated that the stretching units may be constructed with any desired curvature. Most films, however, can be stretched only gradually and in one machine the shaft 33 of the unit 1a has a 5-foot radius. The stretching surface and axis of each successive unit 1b, 1c, etc. is 6 inches longer than the stretching surface and axis of the next preceding unit. In this machine the outside diameter of each sleeve is 6 inches. This machine is particularly designed for the lateral stretching of rubber hydrochloride film. The film may be prestretched longitudinally or in some other manner; it may be unstretched. The amount of stretching in one direction is entirely independent of the amount of stretching in the other direction. The amount of lateral stretching effected on any given machine may be less than that of which the machine is capable by not threading the film over the first roll, but starting it a number of rolls from the end.

Films of different plasticizer contents were stretched on the machine and it was found desirable to use slightly higher temperatures for stretching films having the lower plasticizer contents. Thus, film containing ten per cent dibutyl phthalate which had already been stretched longitudinally about 3.4 to 1 was most easily stretched when the temperature within the stretching chamber was maintained at about 200 to 210° F. This film was made by plying up with heat and pressure, three plies each about 0.00170 inch thick. After being stretched longitudinally as indicated the final sheet had a thickness of about 0.00150 inch. This film was 10 inches wide at the inlet end of the machine and after passing over the thirty-three individual stretching units, it was stretched to a theoretical width of 40 inches. As a matter of fact, the outside edge of the film was found not to be stretched as much as the central portion and it was necessary to trim off an inch or two on each side. Furthermore, even though the film was not removed from contact with the rollers until it had become well set, it shrank to a certain extent. The final width of the trimmed stretched film was about 29 inches. For rubber hydrochloride film containing more or less plasticizer, temperatures in the range of 180 to 220° F. will be used.

Films of different thicknesses are obtainable, stretched in one or more directions, and they may be used for a variety of different purposes.

Modifications may be made in the specific embodiment illustrated and described without departing from the scope of the claims.

What I claim is:

1. The method of stretching thermo-elastic film which comprises heating it and while in a heated condition maintaining it in contact with one expanding surface and after it has been stretched by contact with that surface, bringing it into contact with another expanding surface and thereby further stretching the film and maintaining the film which is stretched in contact with one of said surfaces at all times from the start to the finish of the entire stretching operation.

2. The method of stretching thermo-elastic film laterally, which comprises heating it and maintaining one side of it in heated condition in contact with an expansible material while moving the latter from the short side to the long side of an arcuate member, and then without reducing the stretching tension on the film and before separating the film from contact with said expansible material, bringing the other side of the film while still in heated condition into contact with an expansible material while moving it from the short side to the long side of another arcuate member, thereby stretching the film first in contact with the one expanding surface and then in contact with the other expanding surface, and then cooling the film while stretched.

3. The method of stretching thermo-elastic film laterally which comprises heating the film and then passing it in a heated condition over and under expansible materials moving from the short side to the long side of arcuate members in opposite directions while maintaining the film which is stretched in contact with one of the arcuate members at all times from the start to the finish of the entire stretching operation, whereby the film is stretched laterally as the surface of each expansible material with which it is brought into contact is expanded, and then cooling the film while stretched.

4. The method of transferring from a sleeve of expansible material rotating on an arcuate member to a rotating cylindrical roller, thermo-elastic film stretched laterally and heated to the temperature at which it is elastic, which comprises maintaining the film in contact with the sleeve as it is expanded in passing from the short side to the long side of the arcuate member whereby it is stretched, and then transferring the film to the roller while maintaining the roller in pressure contact with the arcuate member about midway between the ends of the arcuate member and its midpoint on the side thereof on which the sleeve is contracting.

5. A stretching member which comprises an arcuate shaft of uniform circular cross section throughout and having rotatably mounted thereon adjacent one another a plurality of circular discs, each disc being of the same diameter and having a circular central opening just larger than the shaft through which the shaft passes, the discs all being thicker at the opening than at their circumferences, tapering toward their circumferences, and touching on the shorter side of said member only.

6. A stretching member composed of an arcuate shaft of uniform circular cross section throughout and having rotatably mounted thereon adjacent one another a plurality of circular discs, each disc being of the same diameter and having a circular central opening just larger than said shaft through which the shaft passes, the discs all being thicker at the opening than at their circumferences and their surfaces tapering outwardly from the opening at substantially the same angle as radii of the arcuate member drawn to the opposite surfaces of the respective discs.

7. A stretching member composed of an arcuate shaft of uniform circular cross section throughout and having rotatably mounted thereon adjacent one another a plurality of circular discs, each disc being of the same diameter and having a circular central opening just larger than said shaft through which the shaft passes, the discs all being thicker near the opening than at their circumference, tapering toward their circumferences, and touching on the shorter side of said shaft, and a rubber sleeve enclosing the discs.

8. A stretching member composed of an arcuate shaft of uniform circular cross section throughout and having rotatably mounted thereon adjacent one another a plurality of circular discs, each disc being of the same diameter and having a circular central opening just larger than said shaft through which the shaft passes, the discs all being thicker near the opening than at their circumferences, tapering toward their circumferences, and touching on the shorter side of said member, a rubber sleeve enclosing the discs, and means for rotating the discs and the rubber sleeve about the shaft.

9. An arcuate stretching member composed of an arcuate shaft of uniform circular cross section throughout having rotatably mounted thereon adjacent one another a plurality of circular discs, each disc being of the same diameter and having a circular central opening just larger than said shaft through which the shaft passes, the discs all being thicker near the opening than at their circumference, tapering toward their circumferences, and touching on the short side of said member, and means for rotating the discs around the shaft.

10. Apparatus for stretching film which includes a series of arcuate members each with an expansible sleeve with means for moving each sleeve from the short side to the long side of the member on which it is mounted, with the sleeve on an arcuate member so close to the sleeve on the arcuate member adjacent to it that there is just room enough for the film to be passed between them.

MEINDERT LAMMERTSE.

REFERENCES CITED

The following references are of record in the file of this patent:

UNITED STATES PATENTS

| Number | Name | Date |
| --- | --- | --- |
| 1,697,830 | Isherwood | Jan. 1, 1929 |
| 1,808,525 | Cadden | June 2, 1931 |
| 1,814,652 | Weiss | July 14, 1931 |
| 1,997,442 | Walsh | Apr. 9, 1935 |
| 2,064,993 | Sperry | Dec. 22, 1936 |
| 2,328,843 | Osterhof | Sept. 7, 1943 |
| 2,393,191 | Robertson | Jan. 15, 1946 |
| 2,490,781 | Cloud | Dec. 13, 1949 |

FOREIGN PATENTS

| Number | Country | Date |
| --- | --- | --- |
| 351,656 | Great Britain | July 2, 1931 |